May 4, 1948. C. A. PATE 2,440,913
PENCIL GRIP GAUGE
Filed July 12, 1946
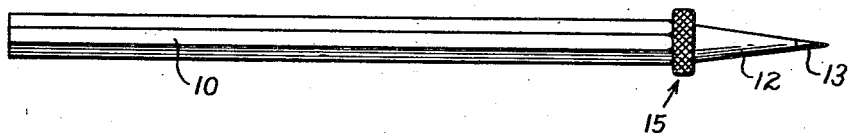
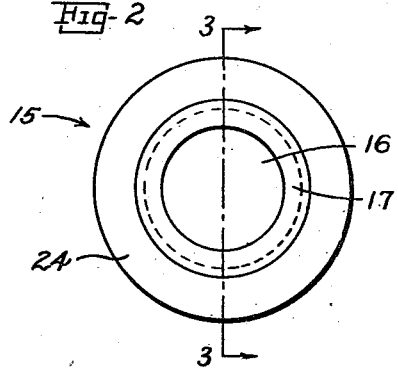
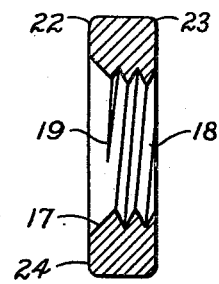
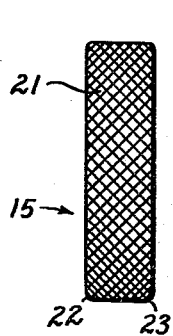
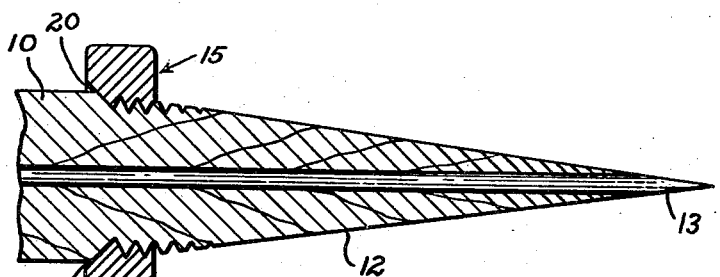
INVENTOR.
Charles A. Pate
BY
Marechal & Biebel
ATTORNEYS Patented May 4, 1948

2,440,913

UNITED STATES PATENT OFFICE 2,440,913

PENCIL GRIP GAUGE

Charles A. Pate, Lufkin, Tex.

Application July 12, 1946, Serial No. 683,102

7 Claims. (Cl. 120—84)

This invention relates to a measuring or gauging tool and protective disk and more particularly to a pencil grip gauge.

It is the principal object of the invention to provide a grip gauge for application to a pencil to develop the correct place for holding the pencil to thereby facilitate the teaching of correct habits in writing including the correct movement of the fingers, hand, and arm, with the body being held in the correct position, and without injury to the eyes.

It is a further object to provide such a grip gauge which will define properly the line or position on the pencil with relation to the point thereof beyond which the finger tips should not be allowed to extend in order to develop proper writing habits and to assure that in use the gripping position or location so defined will be strictly observed and consistently followed by the user.

It is a still further object to provide a pencil grip gauge which is simple and inexpensive in construction, which is light in weight so that it will not impair the balance of or the freedom of movement of the pencil itself, which leaves the main body of the pencil completely free to be gripped by the fingers of the user in the normal way and without interposing any additional material between the fingers and the body of the pencil, and which may be readily removed and replaced following each sharpening of the pencil with the assurance that when so replaced the same uniform relation with respect to the pencil point will be established.

A further object resides in the provision of a teaching aid which operates as a measuring gauge for a pencil, and which in addition to determining and establishing the lowermost line below which the fingers must not extend also operates as a guard to prevent the finger from inadvertently slipping below that line and to train the writer to unconsciously hold the pencil at the correct place even when the gauge has been removed.

Other objects and advantages will be apparent from the following description, the accompanying drawing, and the appended claims.

In the drawing,

Fig. 1 is a view in side elevation of a pencil to which the pencil grip gauge of the present invention has been applied in its normal or operative position;

Fig. 2 is a front elevational view, on an enlarged scale of the grip gauge itself;

Fig. 3 is a vertical sectional view on the line 3—3 of Fig. 2;

Fig. 4 is a side elevational view of the grip gauge; and

Fig. 5 is a fragmentary sectional view, partly in elevation, and on a magnified scale illustrating the tapered point of the pencil and a small portion of the main body of the pencil, the grip gauge being shown in its normal or operative place with respect to the tapered point and the main body.

This application is a continuation-in-part of my copending United States patent application Serial Number 559,813, filed October 21, 1944, now abandoned.

In the teaching of writing, it is important to develop the proper method of holding the pencil, and to assure that throughout the period of learning and until the technique has been acquired and correct habits formed, the student will continue to grip or hold the pencil in the proper place or location and will be effectively deterred or prevented from holding the pencil in any other manner. This is important since the proper holding of the pencil is a part of and has a direct relation to the other parts of the physical act of writing, including the correct movement of the fingers, the hand, arm, the holding of the body in the correct position, and the position at which the head is held during the writing process. A tendency often encountered is to grasp the pencil quite close to the point, this action tending not only to produce strain in the fingers, but leading to a cramped style in writing, often referred to as scribbling, and quite seriously impairing the desired freedom of movement of the hand and arm. Likewise if the pencil is gripped quite close to the point, the fingers tend to interfere with the normal line of vision, and it becomes difficult to follow the writing unless the head is bent over or put to one side, either position being an unnatural and undesirable one, leading to additional strain both upon the neck and in the eye muscles themselves.

In accordance with the present invention a grip gauge is provided which is small and so light in weight that when applied to the pencil it does not materially change the weight or balance of the pencil and thus does not itself impart any objectionable change to the normal writing process. However, it is of such character that when applied it establishes a definite line or position beyond which the finger tips of the user are not permitted to extend, and thus it fixes the place or location of minimum or closest approach of the fingers to the writing end of the pencil and in practice thus establishes a definite and uniform gripping location at which the pencil is held. In so doing, the main body of the pencil, i. e., the portion which is gripped by the fingers of the user, is left entirely free and unencumbered so that in this respect the entire writing operation is exactly the same as if conducted in the absence of the gauge device. Specifically it avoids the application of an auxiliary element of greater thickness or diameter than that of the pencil body itself, and hence avoids any objectionable effect upon the writing habits or technique after having been acquired, which may occur when such body is removed and is no longer present following the initial training period during which the user has become accustomed to gripping the pencil through such auxiliary body.

It is also important that the device be such that it does not interfere with the normal sharpening operation, whenever that is to be performed, and that it be capable of being repositioned following each sharpening operation in such relation to the newly established point of the pencil that the same predetermined uniform holding position is thereby established. In this way the pencil is constantly gripped by the user at the same place or location following each sharpening in relation to the sharpened pencil point as it exists at the time, and thus the maintenance of proper writing habits throughout the entire use of the pencil is assured.

Referring to the drawing which discloses a preferred embodiment of the invention, a typical pencil is shown at 10 the main body of which is shown as hexagonal in cross-section, and on which there has been formed a pointed or tapered end 12 with the lead projecting therefrom at 13. Such pointed end is ordinarily formed by a pencil sharpener and the taper so provided is substantially a uniform amount, or so close to being uniform that in any event the length along the tapered surface 12 from the full diameter of the pencil body to the point 13 does not vary materially from one sharpened pencil to the next.

Since the gauge, in addition to establishing the correct place at which the pencil should be grasped and compelling obedience to that place, must of necessity be used with the pencil during the training period it cannot be of such size or weight as to interfere with the balance or normal use of the pencil. Accordingly, the weight of the gauge must be substantially less than that of the pencil if the balance of the pencil as a writing instrument is to be preserved. Thus when the gauge is used with a new standard pencil which weighs of the order of 7/40 of one ounce, the gauge is constructed of magnesium, preferably, or of other suitable materials, and preferably has a round or circular outer periphery and is approximately 3/32 inch thick and 1/2 inch diameter, and its weight when completed is of the order of 1/80 of one ounce. It will thus be apparent that its weight is not so great in relation to that of the pencil that it destroys the balance or interferes with the proper or normal use of the pencil. In fact the weight of the gauge is so light in relation to that of the pencil that even as the weight of the pencil decreases, as it is used up, its weight does not become an objectionable factor with respect to affecting the balance and use of the pencil throughout the normal useful life of the pencil.

The grip gauge of this invention is indicated generally at 15, and takes the form of an annular body or disk having a central aperture 16. One end of the aperture is counterbored to form a tapered portion 17 which however extends over only a part of the axial length of the disk. Threads 18 are preferably formed through the aperture, the end of the thread running out in the taper 17 as indicated at 19 in Fig. 3.

It will be noted, as most clearly illustrated in Figs. 3 and 5, that with respect to a horizontal plane through the central longitudinal axis of the main body of the pencil, the gauge taper 17 is cut at a substantially greater angle than is the tapered surface 12 of the pencil. This taper 17 while it provides an entering and guiding function for the gauge, it does not prevent threading of the gauge into retaining relation. The relation between the gauge taper 17 and the pencil taper 12 is such as to provide for the proper engagement of the threads so that the gauge when screwed up normally locks itself with the face 24 of the gauge away from the point 13 at a point 20, which is substantially the top or upper end of the tapered surface 12. It will be readily apparent therefore that if the taper 17 and the taper 12 were not as provided and were the same amount, for example, there would not be a proper engagement of the threads since the upper or outer ends of the taper 17 would engage the tapered surface 12 and prevent the threads from cutting in to hold the gauge in place.

The aperture 16 is of less diameter than that of the main body of the pencil 10 while the largest diameter of the tapered portion 17 substantially corresponds with or is slightly in excess of such maximum diameter of the pencil. The outer periphery of the disk is preferably knurled as indicated at 21 to provide a gripping surface, and this diameter is somewhat greater than the outer diameter of the pencil body so that it is capable of projecting radially beyond the pencil body, forming a shield or guard around the entire periphery thereof. Also preferably the edges of the disk are broken as indicated at 22, 23 to avoid the presence of any sharp or cutting surfaces.

In operative position, the grip gauge is threaded over the sharpened end of the pencil, and is pressed upwardly on the tapered end 12 while at the same time being given a rotary movement to effect the screwing or threading thereof upon the tapered portion of the pencil end. This motion takes place with the disk moving so that the tapered portion 17 thereof is first received over the end of the pencil, and such that it will occupy the position remote from the pencil end. As the two tapered surfaces engage, the disk will be allowed to rotate for only a limited travel of the threads, which will cut a corresponding thread in the pencil end upon the application of normal pressure to the knurled surface 20 by holding the same in the fingers. This normal pressure condition is insufficient to cause the disk to travel beyond the tapered end and upon the main body of the pencil, but causes sufficient engagement to take place to provide for the retention of the disk in place during all normal handling, and during the writing operation and until removed by an unscrewing action.

In position, therefore, the face 24 of the disk which is remote from the point 13 serves to limit and define the position at which the fingers grip the main body of the pencil, thereby assuring that the user will consistently grasp the pencil at this same location, whenever the pencil is in use. The position of the grip gauge is always determined as a result of the relation between its own internal diameter and the taper which is produced on the pencil as a result of sharpening the same. With every sharpening, this taper remains substantially the same, and therefore the location of the disk, and the limiting position of the finger tips which it defines in relation to the pencil point, are established and made uniform throughout. As above stated, the grip gauge does not add materially to the weight of the pencil, and leaves the body of the pencil free to be directly grasped in the normal way by the fingers of the user. Thus when the proper writing habit has been established, the use of the grip gauge may be discontinued without requiring a change in the holding of the pencil from that established during the use of the gauge, and thus the properly formed habit is normally retained permanently by the user.

While the article herein described constitutes a preferred embodiment of the invention, it is to be understood that the invention is not limited to this precise article, and that changes may be made therein without departing from the scope of the invention which is defined in the appended claims.

What is claimed is:

1. In a pencil wherein the pencil has a point tapered with a substantially uniform taper, and with the body of the pencil beyond the taper of substantially uniform diameter, the combination of a grip gauge adapted to be received over the tapered and pointed end of the pencil in predetermined relation thereto which comprises an annular body having a central aperture the diameter of which is less than that of the body of the pencil and receivable over the tapered end thereof to locate said annular body in predetermined position adjacent the end of the tapered portion of said pencil and short of the main body thereof leaving the latter free and unencumbered, said annular body in operative position on said pencil limiting and determining the location of the finger tips of the user relative to the pencil point, and said annular body being relatively light in weight in relation to the weight of the pencil such that it does not add materially to the weight of the pencil.

2. In a pencil wherein the pencil has a point tapered with a substantially uniform taper, and with the body of the pencil beyond the taper of substantially uniform diameter, the combination of a grip gauge adapted to be received over the tapered and pointed end of the pencil in predetermined relation thereto to require the user to hold the pencil at the proper place with respect to the pointed end for writing which comprises an annular body having a central aperture, said aperture having an entering and guiding taper substantially greater than the taper on the end of the pencil and receivable over said tapered end following the sharpening of said pencil to locate said annular body in predetermined uniform spacing from the pencil lead and short of the main body of the pencil leaving the latter free and unencumbered, said annular body determining the limiting position of the fingers for holding the pencil and requiring the holding thereof at a predetermined minimum distance from the point, and said annular body being relatively light in weight in relation to the weight of the pencil such that it does not add materially to the weight of the pencil.

3. In a pencil wherein the pencil has a point tapered with a substantially uniform taper, and with the body of the pencil beyond the taper of substantially uniform diameter, the combination of a grip gauge adapted to be received over the tapered and pointed end of the pencil in predetermined relation thereto to require the user to hold the pencil at the proper place with respect to the pointed end for writing which comprises a small, light weight annular body of greater external diameter than that of the body of the pencil and having an aperture adapted to be received over the tapered end of the pencil, means for retaining said annular body in operative position on the tapered end of the pencil and in predetermined spaced relation with respect to the point thereof while preventing travel thereof onto the main body of the pencil, said annular body in operative position on said pencil determining the lowermost location of the finger tips in gripping the pencil while leaving the body of the pencil free and unencumbered for normal gripping action by the fingers of the user, and said annular body being relatively light in weight in relation to the weight of the pencil such that it does not add materially to the weight of the pencil.

4. In a pencil wherein the pencil has a point tapered with a substantially uniform taper, and with the body of the pencil beyond the taper of substantially uniform diameter, the combination of a grip gauge adapted to be received over the tapered and pointed end of the pencil in predetermined relation thereto to require the user to hold the pencil at the proper place with respect to the pointed end for writing which comprises an annular body of greater external diameter than that of the body of the pencil and having a central aperture adapted to be received over the tapered end of the pencil, means for retaining said annular body in operative position on the tapered end of the pencil and in predetermined spaced relation with respect thereto while preventing travel thereof on to the main body of the pencil, said means comprising threads formed on the interior of said annular body aperture providing for screwing said annular body upon said tapered end of the pencil, said annular body in operative position on said pencil determining the lowermost location of the finger tips in gripping the pencil while leaving the body of the pencil free and unencumbered for normal gripping action by the fingers of the user, and said annular body being relatively light in weight in relation to the weight of the pencil such that it does not add materially to the weight of the pencil.

5. A pencil having a point tapered with a substantially uniform taper, with the body of the pencil beyond the taper of substantially uniform diameter, and combined with said tapered point an attachment comprising a grip gauge for ready application to and removal from the sharpened end of the pencil following each sharpening thereof in a pencil sharpener having a substantially disk shaped body with a central aperture of less diameter than that of the main body of the pencil, the outer diameter of said disk being greater than that of the main body of the pencil, said body being receivable over the tapered end of the pencil up to a predetermined position short of the main body of the pencil in uniform spacing from the pencil point following each sharpening thereof as determined by the size of said central aperture relative to that of the main body of the pencil, said disk being relatively light in weight in relation to the weight of the pencil such that it does not add materially to the weight of the pencil, the surface of said disk opposite that facing the pencil tip providing for determining the location of the fingers of the user and limiting their approach to the pencil tip to a predetermined minimum distance as necessary to develop proper writing technique.

6. A pencil having a point tapered with a substantially uniform taper, with the body of the pencil beyond the taper of substantially uniform diameter, and combined with said tapered point an attachment comprising a grip gauge quickly removable from and attachable to the tapered end of the pencil as sharpened in a pencil sharpener to require the holding of the pencil in properly spaced relation from the end thereof having a disk of substantially light weight with a central aperture therein at least a portion of which is tapered to a greater degree in the same direction as the taper of the end of the pencil to provide an entering and guiding means for the tapered end of the pencil, said aperture also being threaded to provide for receiving the disk over the tapered end of the pencil with a rotary motion adapted to secure the disk in operative position upon the end of the pencil and in predetermined uniform spaced relation from the end of the pencil following each sharpening thereof as determined by the size of said tapered aperture relative to that of the main body of the pencil, said disk being relatively light in weight in relation to the weight of the pencil such that it does not add materially to the weight of the pencil, the face of said disk remote from the pencil end serving to space the fingers of the user a predetermined minimum distance from the end of the pencil while providing for direct gripping contact of the fingers with the body of the pencil itself.

7. A pencil having a point tapered with a substantially uniform taper, with the body of the pencil beyond the taper of substantially uniform diameter, and combined with said tapered point an attachment comprising a grip gauge quickly removable from and attachable to the tapered end of the pencil as sharpened in a pencil sharpener to require the holding of the pencil in properly spaced relation from the end thereof having a disk of substantially light weight with a central aperture therein at least a portion of which is tapered to a greater degree in the same direction as the taper of the end of the pencil to provide an entering and guiding means for the tapered end of the pencil, said aperture beyond said tapered portion being threaded to provide for receiving the disk over the tapered end of the pencil with a rotary motion adapted to secure the disk in operative position upon the end of the pencil and in predetermined uniform spaced relation from the end of the pencil following each sharpening thereof, the outer periphery of said disk being knurled to serve as a gripping surface to facilitate such threading operation, said disk being light in weight in relation to the weight of the pencil such that it does not materially affect the normal manipulation of the pencil, the face of said disk remote from the pencil end serving to space the fingers of the user a predetermined minimum distance from the end of the pencil while providing for direct gripping contact of the fingers with the body of the pencil itself.

CHARLES A. PATE.